United States Patent
Risi et al.

(10) Patent No.: US 12,138,552 B2
(45) Date of Patent: Nov. 12, 2024

(54) GAME ANALYSIS PLATFORM WITH AI-BASED DETECTION OF GAME BOTS AND CHEATING SOFTWARE

(71) Applicant: modl.ai ApS, Copenhagen N (DK)

(72) Inventors: Sebastian Risi, Copenhagen S (DK); Christoffer Holmgård Pedersen, Copenhagen K (DK)

(73) Assignee: modl.ai ApS, Copenhagen N (DK)

(*) Notice: Subject to any disclaimer, the term of this patent is extended or adjusted under 35 U.S.C. 154(b) by 302 days.

(21) Appl. No.: 17/756,206

(22) PCT Filed: Nov. 16, 2020

(86) PCT No.: PCT/US2020/060669
§ 371 (c)(1),
(2) Date: May 19, 2022

(87) PCT Pub. No.: WO2021/126436
PCT Pub. Date: Jun. 24, 2021

(65) Prior Publication Data
US 2022/0410015 A1    Dec. 29, 2022

Related U.S. Application Data

(60) Provisional application No. 62/949,079, filed on Dec. 17, 2019.

(51) Int. Cl.
*A63F 13/00*    (2014.01)
*A63F 13/533*    (2014.01)
(Continued)

(52) U.S. Cl.
CPC ............ *A63F 13/75* (2014.09); *A63F 13/533* (2014.09); *A63F 13/79* (2014.09); *G06N 20/00* (2019.01)

(58) Field of Classification Search
CPC ........ A63F 13/75; A63F 13/533; A63F 13/79; G06N 20/00
See application file for complete search history.

(56) References Cited

U.S. PATENT DOCUMENTS 10,427,048 B1 * 10/2019 Lundquist ............. A63F 13/352
10,438,225 B1 * 10/2019 Reading ............. G06Q 30/0225
(Continued)

FOREIGN PATENT DOCUMENTS

| KR | 1020180025692 A | 3/2018 |
| WO | 2006014560 A2 | 2/2006 |
| WO | 2018004839 A1 | 1/2018 |

OTHER PUBLICATIONS

Kang, et al., "Multimodal game bot detection using user behavioral characteristics", Jun. 2, 2018 (retrieved May 2, 2024), <https://web.archive.org/web/20180602141853/https://springerplus.springeropen.com/articles/10.1186/s40064-016-2122-8> (Year: 2018).*

(Continued)

*Primary Examiner* — Dmitry Suhol
*Assistant Examiner* — Jason Pinheiro
(74) *Attorney, Agent, or Firm* — Garlick & Markison; Bruce E. Stuckman

(57) ABSTRACT

A method is implemented via a game analysis platform that includes at least one processor and at least one memory. The method includes: generating a training data set based on game data collected from actual players; training an artificial intelligence (AI) model using machine learning based on the training data set; gathering actual game data from game play; processing the actual game data via the AI model to generate detection results; and detecting a potential player bot or use of cheating software when detection results exceed a detection threshold.

18 Claims, 5 Drawing Sheets

(51) Int. Cl.
　　　*A63F 13/75*　　(2014.01)
　　　*A63F 13/79*　　(2014.01)
　　　*G06N 20/00*　　(2019.01)

(56) References Cited

U.S. PATENT DOCUMENTS

| | | | | |
|---|---|---|---|---|
| 10,459,827 | B1* | 10/2019 | Aghdaie | G06F 11/0766 |
| 11,253,785 | B1* | 2/2022 | Niknafs | A63F 13/335 |
| 11,386,349 | B1* | 7/2022 | Prisadnikov | G06N 20/00 |
| 2008/0004107 | A1 | 1/2008 | Nguyen et al. | |
| 2009/0069088 | A1* | 3/2009 | Levitt | G07F 17/3241 |
| | | | | 463/42 |
| 2014/0357355 | A1 | 12/2014 | Ren et al. | |
| 2019/0253504 | A1* | 8/2019 | Wang | H04L 63/1483 |
| 2019/0334905 | A1* | 10/2019 | Lelcuk | H04L 63/0807 |
| 2019/0370493 | A1* | 12/2019 | Deutschmann | H04L 63/0861 |
| 2020/0406147 | A1* | 12/2020 | Gauffin | G07F 17/3241 |
| 2021/0133304 | A1* | 5/2021 | Larson | H04L 63/08 |
| 2021/0299573 | A1* | 9/2021 | Pourabolghasem | A63F 13/75 |
| 2023/0104757 | A1* | 4/2023 | Pramod | G06N 3/08 |
| | | | | 706/11 |
| 2023/0294002 | A1* | 9/2023 | Salazar | H04L 67/131 |
| | | | | 463/29 |
| 2023/0356093 | A1* | 11/2023 | Desimone | A63F 13/837 |
| 2024/0147234 | A1* | 5/2024 | Turgeman | H04W 12/06 |

OTHER PUBLICATIONS

Tsikerdekis, et al., "Efficient Deep Learning Bot Detection in Games Using Time Windows and Long Short-Term Memory (LSTM)," in IEEE Access, vol. 8, pp. 195763-195771, 2020 (retrieved May 2, 2024), <https://ieeexplore.ieee.org/stamp/stamp.jsp?tp=&arnumber=9239256> (Year: 2020).*

Bernardi, et al., "Game Bot Detection in Online Role Player Game through Behavioural Features", ICSOFT, Jun. 2018 (Retrieved May 2, 2024), <https://pdfs.semanticscholar.org/8112/9571f94e17b0aad5eed363c9fdfcb45d6b0f.pdf?_gl=1*180ehps*_ga*MTcONDQzMzU1LjE3MTQ2NjkONDc.*_ga_H7P4ZT52H5*> (Year: 2017).*

Chung, Y., et al., 2013 (retrieved May 2, 2024), "Game Bot Detection Approach Based on Behavior Analysis and Consideration of Various Play Styles", ETRI Journal, 35: 1058-1067, <https://onlinelibrary.wiley.com/doi/epdf/10.4218/etrij.13.2013.0049> (Year: 2013).*

Tsikerdekis (Year: 2020).*
Chung (Year: 2013).*
Bernardi (Year: 2018).*
Kang (Year: 2018).*

European Patent Office; Extended European Search Report; EP Application No. 20773761.0; Oct. 6, 2022; 8 pgs.

Yannakakis, et al.; Artificial Intelligence and Games; Springer; Oct. 6, 2017.

International Searching Authority; International Search Report and Written Opinion; Application No. PCT/US2020/060669; Mar. 2, 2021; 8 pgs.

* cited by examiner

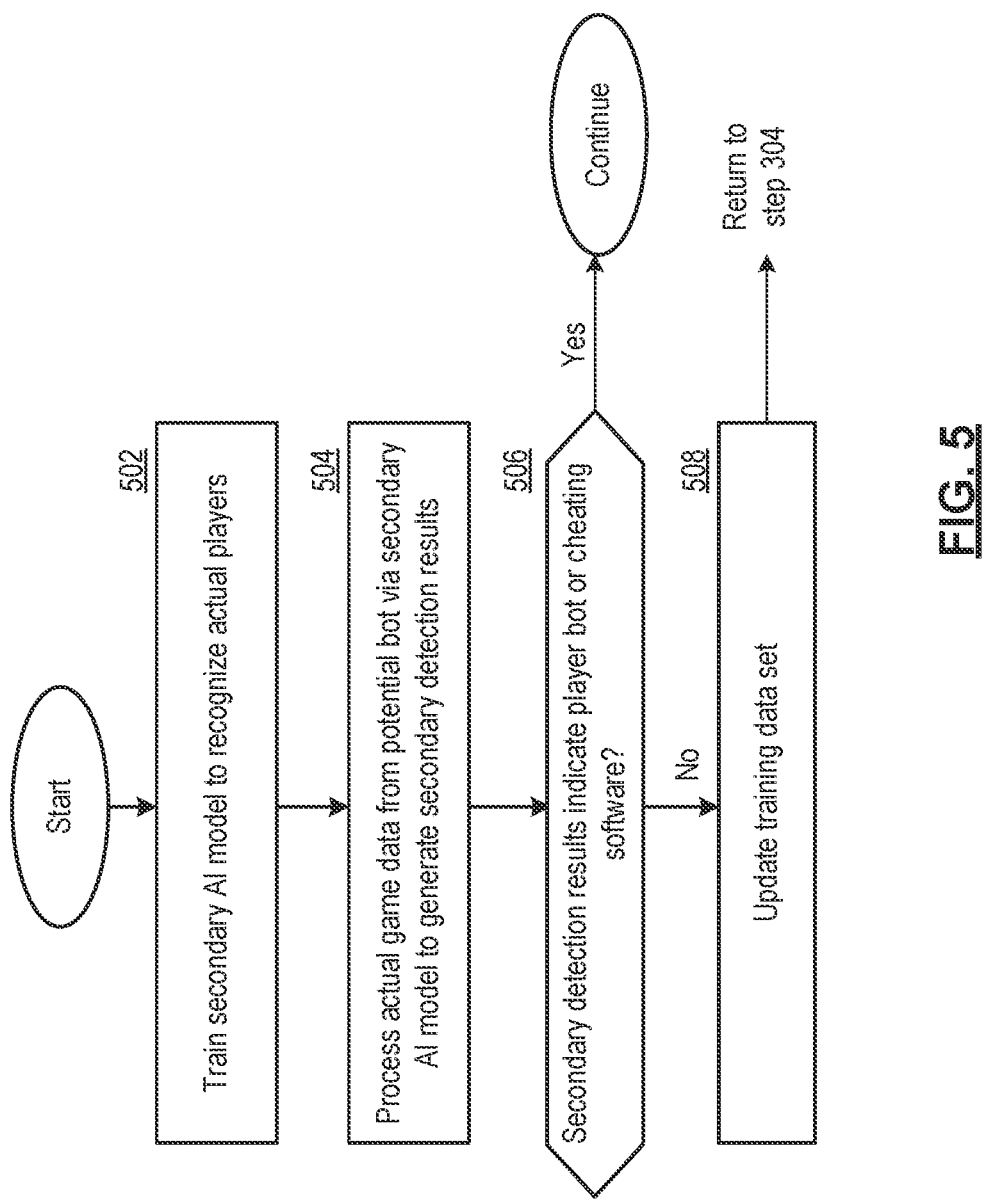

GAME ANALYSIS PLATFORM WITH AI-BASED DETECTION OF GAME BOTS AND CHEATING SOFTWARE

CROSS-REFERENCE TO RELATED APPLICATIONS

The present U.S. Utility Patent Application claims priority pursuant to 35 U.S.C. § 371 as U.S. National Phase Application of PCT/US2020/060669, entitled "GAME ANALYSIS PLATFORM WITH AI-BASED DETECTION OF GAME BOTS AND CHEATING SOFTWARE", filed 16 Nov. 2020, which claims priority pursuant to 35 U.S.C. § 119(e) to U.S. Provisional Patent Application No. 62/949,079, entitled "GAME ANALYSIS PLATFORM WITH AI-BASED DETECTION OF GAME BOTS AND CHEATING SOFTWARE", filed 17 Dec. 2019, both of which are hereby incorporated herein by reference in their entirety and made part of the present U.S. Utility Patent Application for all purposes.

TECHNICAL FIELD

The present disclosure relates to processing systems and applications used in the operation of gaming applications used by gaming systems and other gaming devices.

BRIEF DESCRIPTION OF THE SEVERAL VIEWS OF THE DRAWINGS

FIG. 5 presents a flowchart representation of a method in accordance with an embodiment of the present disclosure.

DETAILED DESCRIPTION

Figure 1:
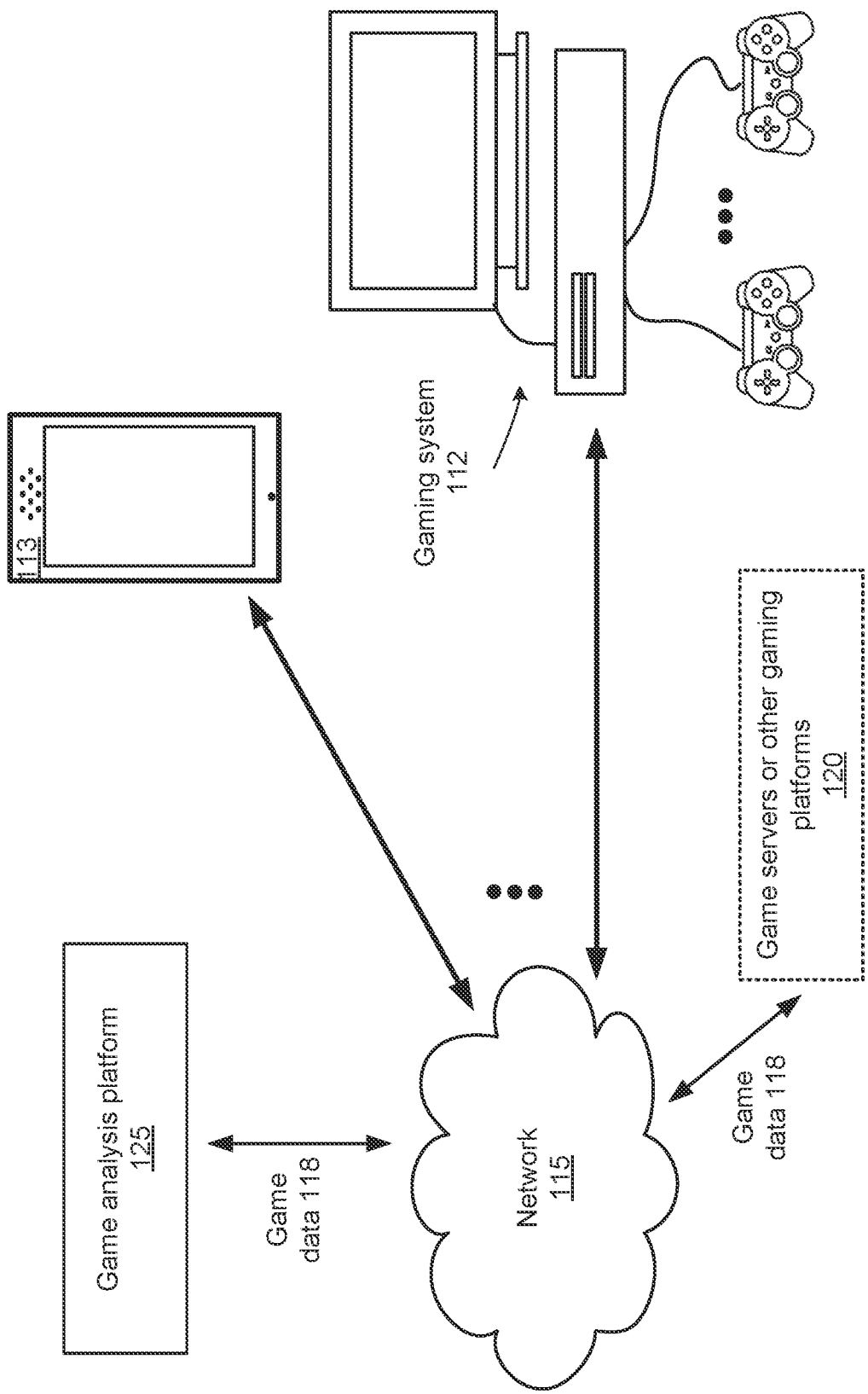
FIG. 1 presents a pictorial/block diagram representation of a game analysis system in accordance with an embodiment of the present disclosure.

FIG. 1 presents a pictorial/block diagram representation of a game analysis system in accordance with an embodiment of the present disclosure. In particular, a game analysis platform 125 is presented that receives game data 118 via network 115 generated by gaming devices such as mobile device 113 and gaming system 112 via network 115. The network 115 can be the Internet or other wide area or local area network. The game analysis system 125 can be used in the analysis of players of a gaming application corresponding to a game. In various embodiments, the game analysis platform 125 is a game server that executes the gaming application to facilitate the play of the game via the gaming devices. In the alternative, the game analysis platform 125 is a processing device that communicates via network 115 with one or more game servers or other gaming platform(s) 120 that execute the gaming application to facilitate the play of the game via the gaming devices.

In circumstances where the game analysis platform 125 is separate from the game server(s) or other gaming platforms(s) 120, the game data 118 can include a bit stream or other data, for example, actual game output including pixel data or other game images, scores, metrics and/or other game output, telemetry data including data gathered from play traces that can include, for example, player input, game status, game events, game achievements, progress toward game goals, game parameters, KPIs and/or other game data and analytics. In these examples, game data 118 can be received from these game server(s) or other gaming platforms(s) 120 via the network 118 in addition to or in the alternative to receiving the game data from the gaming devices. In circumstances where the game analysis platform 125 includes a game server or other gaming platform, the game data 118 received from the game devices can, for example, include merely the player input and the additional game data can be generated by the game analysis platform 125 itself through the execution of the gaming application.

In operation, the game analysis platform 125 detects, based on the game data 118, when a game is being played by a player bot rather than an actual player. In addition or in the alternative, the game analysis platform 125 detects, based on the game data 118, the use by a player of other cheating software such as such as client-side modifications or a backdoor to developer tools that give the player perfect aim (aim-bots), invulnerability, invisibility, lets the player see through walls (wall-hacks), move through wall, changes the speed of the game, increases a player's power, health or points, and/or provides one or more other cheats and/or unfair advantages, etc.

Consider an application where one or more game servers are running a tournament for game players. The use of player bots or other cheating software can be detected and used to disqualify cheating players that may attempt to substitute a player bot for all or a portion of their play of a game or attempt use other cheating software for all of a portion of their play of a game.

The operation of the game analysis platform 125 will be described in greater detail in conjunction with FIGS. 2-5, including several optional functions and features and examples thereof.

Figure 2:
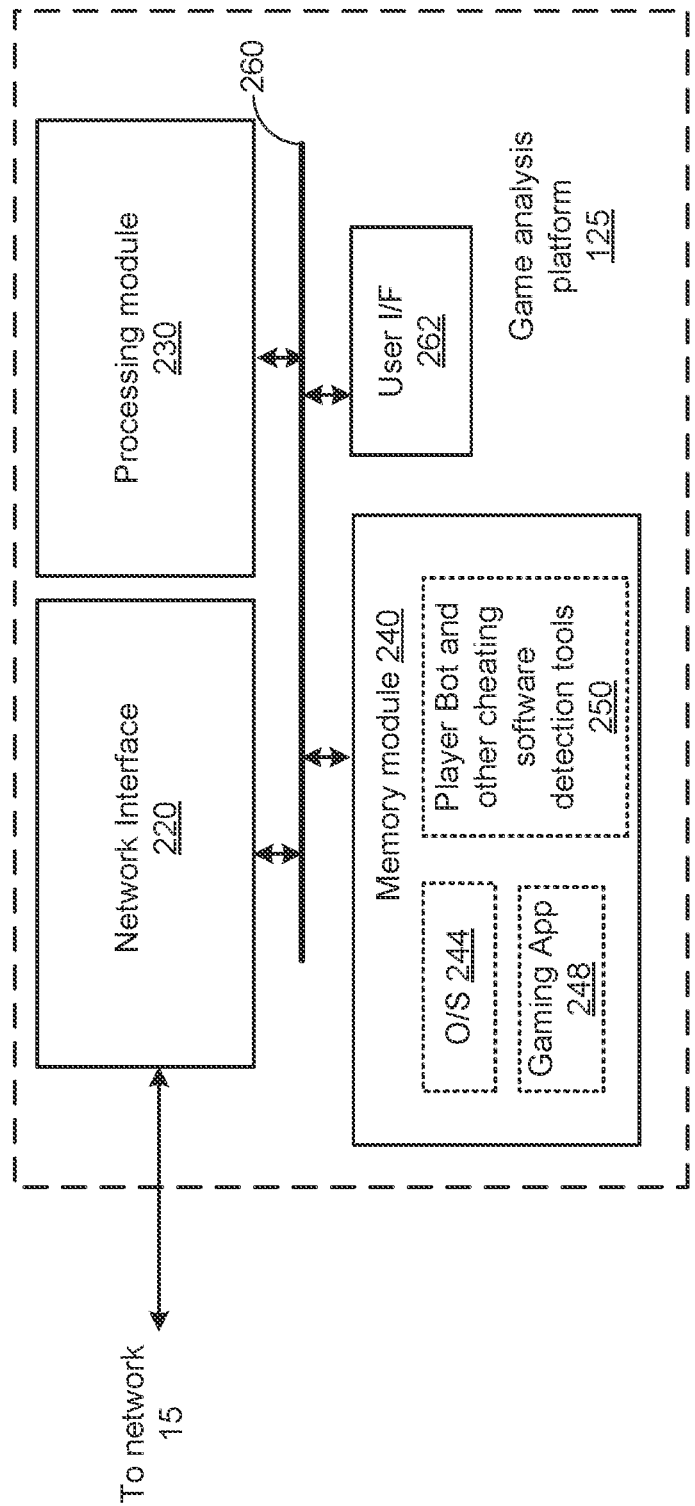
FIG. 2 presents a block diagram representation of a game analysis platform in accordance with an embodiment of the present disclosure.

FIG. 2 presents a block diagram representation of a game analysis platform in accordance with an embodiment of the present disclosure. In particular, the game analysis platform 125 includes a network interface 220 such as a 3G, 4G, 5G or other cellular wireless transceiver, a Bluetooth transceiver, a WiFi transceiver, UltraWideBand transceiver, WIMAX transceiver, ZigBee transceiver or other wireless interface, a Universal Serial Bus (USB) interface, an IEEE 1394 Firewire interface, an Ethernet interface or other wired interface and/or other network card or modem for communicating via network 115.

The game analysis platform 125 also includes a processing module 230 and memory module 240 that stores an operating system (O/S) 244 such as an Apple, Unix, Linux or Microsoft operating system or other operating system, optionally one or more gaming applications 248, and one or more player bot and cheating software detection tools 250. In particular, the O/S 244, gaming application(s) 248 and one or more player bot and cheating software detection tools 250 each include operational instructions that, when executed by the processing module 230, cooperate to configure the processing module into a special purpose machine to perform the particular functions described herein.

The game analysis platform 125 can also include a user interface (I/F) 262 such as a display device, touch screen, key pad, touch pad, joy stick, thumb wheel, a mouse, one or more buttons, a speaker, a microphone, an accelerometer, gyroscope or other motion or position sensor, video camera or other interface devices that provide information to a user of the game analysis platform 125 and that generate data in response to the user's interaction with the game analysis platform 125.

The processing module 230 can be implemented via a single processing device or a plurality of processing devices. Such processing devices can include a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions that are stored in a memory, such as memory 240. The memory module 240 can include a hard disc drive or other disc drive, read-only memory, random access memory, volatile memory, non-volatile memory, static memory, dynamic memory, flash memory, cache memory, and/or any device that stores digital information. Note that when the processing device implements one or more of its functions via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. While a particular bus architecture is presented that includes a single bus 260, other architectures are possible including additional data buses and/or direct connectivity between one or more elements. Further, the game analysis platform 125 can include one or more additional elements that are not specifically shown.

The gaming application 248 can be, for example, a multiplayer or single player game including a casual game or a hardcore game, such as a shooter or other combat game, fantasy game or other action or adventure game, a simulation game that simulates the operation of a real-world vehicle device or system, a realtime strategy game, a puzzle, a sports game, role-playing game, board game or other video or digitally animated game. In various embodiments, one or more versions of the gaming application 248 can be stored including, for example, multiple versions or updates of the gaming application, one or more sets of game parameters, one or more levels and other content and/or other gaming data.

The player bot and other cheating software detection tools 250 can include one or more AI models that operate via classical pattern recognition such as classical clustering analysis or other techniques. For example, the one or more AI models can operate via K-means clustering or other pattern recognition algorithm, anomaly detection, decision trees, association rules or other AI methodologies that are tuned or otherwise developed utilizing the game data from actual players (and/or player bots and/or players using other cheating software). The one or more AI models can operate via a machine learning that is trained via the game data from actual players (and/or player bots and/or players using other cheating software). Examples of such machine learning algorithms include artificial neural networks including deep learning convolution neural networks or other neural network models (or more simply "neural networks" as used herein), support vector machines, Bayesian networks, genetic algorithms and/or other machine learning techniques that are trained via unsupervised, semi-supervised, supervised and/or reinforcement learning and can further include feature learning, sparse dictionary learning and/or training via other machine learning techniques.

In operation, the player bot and other cheating software detection tools 250 analyze game data 118 and/or other game data generated by the gaming application in real-time from games being played in order to detect player bots and/or players using other cheating software that are playing online. In various embodiments, the player bot and other cheating software detection tools 250 operate based on training a neural network or other AI model through imitation learning on a collection of human players. Once training of this network is performed, the AI model can learn an 'average' policy that responds similarly to a human player as opposed to a player bot and/or player using other cheating software. While players are playing the game online who might be bots or players using other cheating software or non-cheating players, the game analysis platform 125 runs the AI model and compares the output in the form of detection results (e.g. which action to perform in a certain situation) with the action chosen by the player. Using an appropriate similarity metric such as a detection score, detection probability, Euclidean distance, a binary detection decision or other detection metric, the method then calculates how different the player in question plays from the trained AI model.

The method can run in real-time and can either be applied to a completed play trace or is applied in a sliding window or other window of predetermined or fixed time duration that indicates a duration of game play. By applying the method to a subset of the complete play trace, the approach is also able to classify and detect, when human players had a player bot take over for certain time periods or used other cheating software for certain time periods. Once a player bot and/or player using other cheating software is detected, and optionally, is positively confirmed via other feedback, the game analysis platform 125 can identify a player (i.e., a cheating player) associated with the game play for disqualification. Furthermore, the corresponding game play data can be added to the training data set and used in retraining/adjusting the AI model as negative examples to improve the AI model. The player identification can be sent to the gaming servers or other gaming platforms 120 for disqualification of the cheating player and/or used directly by the game analysis platform 125 to disqualify the cheating player in circumstances where the game analysis platform 125 operates as a game server itself.

The game analysis platform 125 improves the performance of online gaming platforms by detecting and/or disqualifying players who attempt to substitute an automated player bot and/or other cheating software for their own play. This provides a fairer and more desirable game environment for actual players who wish to compete based on their own skill.

Figure 3:
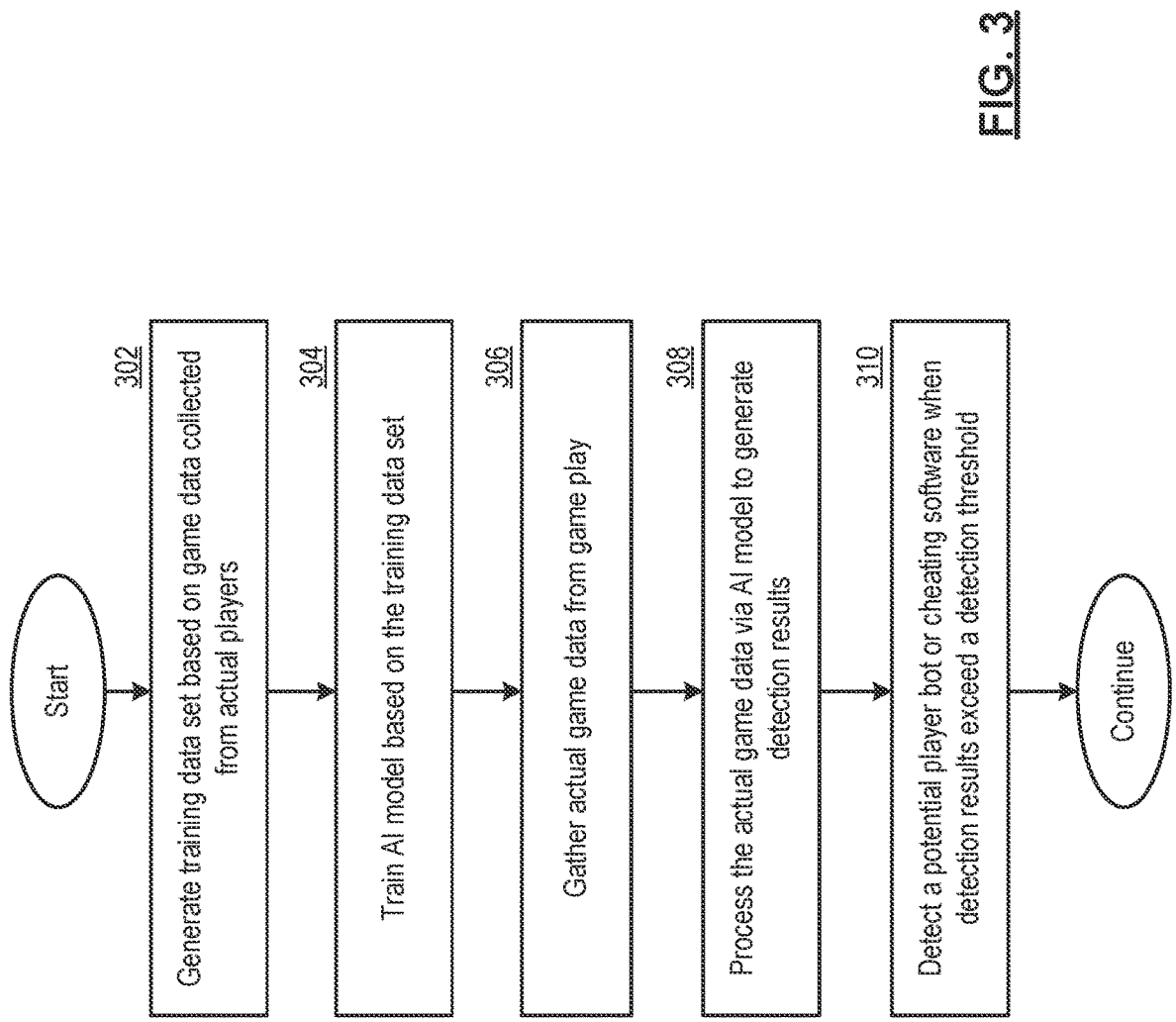
FIG. 3 presents a flowchart representation of a method in accordance with an embodiment of the present disclosure.

FIG. 3 presents a flowchart representation of a method in accordance with an embodiment of the present disclosure. In particular, a method is presented for use with any of the functions and features described in conjunction with FIGS. 1 and 2. Step 302 includes generating a training data set based on game data collected from actual players. In particular, play traces and/or other game data can be generated, received or otherwise collected for a wide range of actual players that represent different skill levels from expert to beginner, different demographics, different geographical regions, different player motivations and behaviors, play styles and/or different player profiles.

Step 304 includes training an AI model based on the training data set. As discussed, the AI model can include an artificial neural network, classical pattern recognition algorithm or other AI model that is trained/tuned based on the training data set to imitate the performance of an actual player and/or to otherwise distinguish actual players from player bots and/or players using other cheating software. In various embodiments, the AI model can be trained on a large data set and then tested via a test data set with known game play origin (actual player vs. player bot and/or player using other cheating software) to determine the performance of the AI model in detecting a player bot and/or player using other cheating software. In various embodiments, the training data set can be augmented with additional data until the performance of the AI model on the test data set reaches a desired level of error detection or other performance.

Step 306 includes gathering actual game data from game play. This game data 118 such as play traces, game telemetry data or other game data and analytics can be received via a network when online players are playing a gaming application 248. Step 308 includes processing the actual game data via the AI model to generate detection results. Consider the case where the AI model is implemented via a clustering algorithm having a large number of clusters, each representing a different class/characterization of actual players. In this case, processing the game data can result in a distance metric such as a Euclidean distance from each of the clusters. Consider another example where the AI model is implemented via a neural network that generates an indication of what an actual (non-cheating) player would do in response a particular game situation and/or that generates a scalar such as a probability, discriminator or other scalar, vector or matrix that represents a fit or match between the game data and the model of the actual (non-cheating) player.

Step 310 includes detecting a potential player bot or cheating software when detection results exceed (or otherwise compare unfavorably to) a detection threshold. Consider the example where the AI model is implemented via an artificial neural network that generates a scalar such as a probability, discriminator or other scalar or vector that represents a fit or match between the game data and the model of the actual (non-cheating) player. The scalar or vector fit or match between the game data and the model of the actual player can be compared with a threshold that indicates a boundary of expected actual player behavior. When the scalar or vector fit or match falls within (or otherwise compare favorably to) this threshold, the method determines that an actual (non-cheating) player is detected. Alternatively, when the threshold is exceeded, the method determines that a potential player bot or use of cheating software is detected.

Consider a further example where the AI model imitates the performance of an actual (non-cheating) player. The AI model can be presented a sequence of game situations and player responses. Circumstances where the responses of the player imitated by the AI model differ from the player in the game can be accumulated. If the number of these differences (either total or during some timing window) exceed a threshold, the player bot and other cheating software detection tool 250 can determine that the player is a potential player bot or is otherwise using cheating software.

Consider another example where the AI model is implemented via a clustering algorithm having a large number of clusters, each representing a different class/characterization of actual players. Differing thresholds can be selected for each cluster, based on the spread of each of the clusters. When the distance from each of the clusters exceeds the threshold for the corresponding cluster, the method determines that a potential player bot is detected. If however, the distance from one of the clusters falls within the threshold for the corresponding cluster, the method determines that an actual (non-cheating) player is detected.

Whether or not a potential player bot and/or use of cheating software is detected, the method can continue by returning to step 306 to analyze actual game data for other players. Furthermore, when a potential player bot and/or use of cheating software is detected, the method can proceed to perform further steps to confirm the detection of a player bot and/or use of cheating software as will be described further in conjunction with FIGS. 4 and/or 5.

Figure 4:
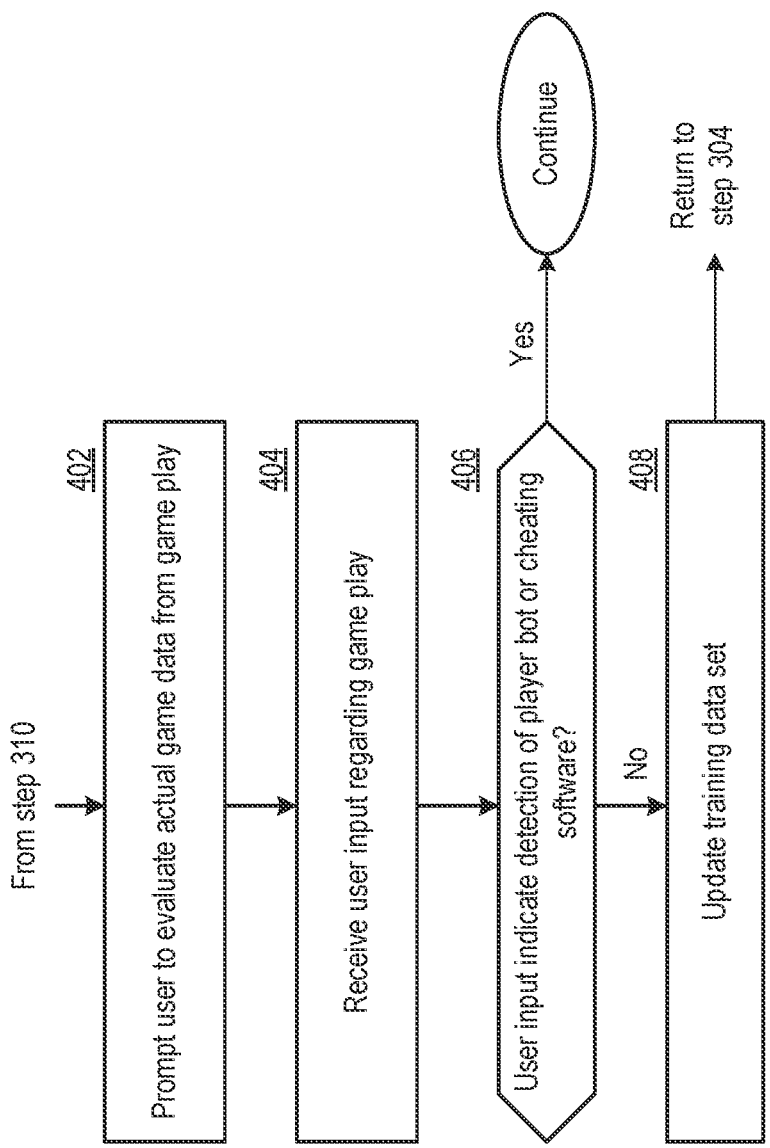
FIG. 4 presents a flowchart representation of a method in accordance with an embodiment of the present disclosure.

FIG. 4 presents a flowchart representation of a method in accordance with an embodiment of the present disclosure. In particular, a method is presented for use with any of the functions and features described in conjunction with FIGS. 1-3. In particular the method proceeds from the detection of a potential player bot and/or use of cheating software in step 310 of FIG. 3 to perform further steps to confirm the detection of a player bot. Step 402 includes prompting a user of the game analysis platform 125, such as a game analyst, judge, referee or other user, to evaluate actual game data from the game play corresponding to the potential player bot and/or use of cheating software. This can include, for example, presentation via a graphical user interface (GUI) presented via user interface 262 of the game analysis platform 125 of game data. In this fashion, the user can evaluate actual game output displays, scores, metrics and other game output, telemetry data including data gathered from play traces that can include, for example, player input, game status, game events, game achievements, progress toward game goals, game parameters, KPIs and/or other game data and analytics.

In step 404, the GUI can receive user input regarding the game play. This user input is evaluated in decision step 406 to determine whether or not the user input indicates that a player bot and/or use of cheating software is positively detected. If the user input confirms the potential player bot and/or use of cheating software as an actual player bot and/or user of cheating software (i.e. Yes), the method continues to, for example, report the player bot and/or the associated player identification to the game for disqualification. If however the user input includes an indication that the potential player bot and/or user of cheating software could likely be an actual player not using cheating software (i.e. No), the method proceeds in step 408 to update the training data set with the game data associated with the actual (non-cheating) player and returns to step 304 to update/retrain the AI model with this new data.

It should be noted that this example further improves the monitoring of gaming applications to detect and/or disqualify players using player bots or cheating software. In particular, the use of the AI model permits all game play to be monitored in real-time, detecting potent use of player bots or cheating software, and triggering user review of the game play via the graphical user interface. This narrows down the user review to only those cases where the AI model has detected suspicious activity—providing faster, more efficient and ubiquitous monitoring.

FIG. 5 presents a flowchart representation of a method in accordance with an embodiment of the present disclosure. In particular, a method is presented for use with any of the functions and features described in conjunction with FIGS. 1-4. Step 502 includes training a secondary AI model to recognize actual players. In various embodiments, the primary and secondary AI models can be of two different types. For example, one of the AI models can be an artificial neural network with the other model can be a k-means clustering algorithm.

In step 504, the method proceeds from the determination in step 310 of FIG. 3 to process the actual game data from the potential player bot to generate secondary detection results. If the secondary detection results confirm the potential player bot as an actual player bot or cheating software user (i.e. Yes), the method continues to, for example, report the player bot and/or the associated player identification to the game for disqualification. If however the secondary detection result includes an indication that the potential player bot or other cheating software use could likely be an actual player, such as a skilled player who is not cheating (i.e. No), the method proceeds in step 508 to update the training data set with the game data associated with the actual player and returns to step 304 to update/retrain the AI model with this new data.

In various embodiments, the secondary AI model can be more complicated and take longer to execute that the primary AI model. The secondary AI model can be employed in circumstances (or only in circumstances) when a potential player bot or other cheating software is detected. This further improves the technology of game analysis by saving time in execution of the player bot and other cheating software detection tools.

In addition, the primary AI model can be designed with a low probability (e.g. 5%, 1%, etc.) of error in determining an actual player is present—while accepting a higher probability of error (e.g. 15%, 10%, etc.) in determining that a potential player bot or other cheating software is detected. The secondary AI can have a lower probability of error (e.g. 5%, 1%, etc.) in determining that a potential player bot or other cheating software is detected to ensure that final disqualification decisions are more accurate.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Other examples of industry-accepted tolerance range from less than one percent to fifty percent. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%). Some relativity between items may range from a difference of less than a percentage level to a few percent. Other relativity between items may range from a difference of a few percent to magnitude of differences.

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing module", "processing circuit", "processor", "processing circuitry", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing circuitry, and/or processing unit may be, or further include, memory and/or an integrated memory element, which may be a single memory device, a plurality of memory devices, and/or embedded circuitry of another processing module, module, processing circuit, processing circuitry, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing circuitry, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing circuitry and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing circuitry and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with one or more other routines. In addition, a flow diagram may include an "end" and/or "continue" indication. The "end" and/or "continue" indications reflect that the steps presented can end as described and shown or optionally be incorporated in or otherwise used in conjunction with one or more other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, a quantum register or other quantum memory and/or any other device that stores data in a non-transitory manner. Furthermore, the memory device may be in a form of a solid-state memory, a hard drive memory or other disk storage, cloud memory, thumb drive, server memory, computing device memory, and/or other non-transitory medium for storing data. The storage of data includes temporary storage (i.e., data is lost when power is removed from the memory element) and/or persistent storage (i.e., data is retained when power is removed from the memory element). As used herein, a transitory medium shall mean one or more of: (a) a wired or wireless medium for the transportation of data as a signal from one computing device to another computing device for temporary storage or persistent storage; (b) a wired or wireless medium for the transportation of data as a signal within a computing device from one element of the computing device to another element of the computing device for temporary storage or persistent storage; (c) a wired or wireless medium for the transportation of data as a signal from one computing device to another computing device for processing the data by the other computing device; and (d) a wired or wireless medium for the transportation of data as a signal within a computing device from one element of the computing device to another element of the computing device for processing the data by the other element of the computing device. As may be used herein, a non-transitory computer readable memory is substantially equivalent to a computer readable memory. A non-transitory computer readable memory can also be referred to as a non-transitory computer readable storage medium.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprising:
   generating, via a game analysis platform that includes at least one processor and at least one memory, a training data set based on game data collected from actual players;
   training, via the game analysis platform, a primary artificial intelligence (AI) model using machine learning based on the training data set to detect player bots;
   gathering, via the game analysis platform, actual game data from game play;
   processing the actual game data via the primary AI model to generate primary detection results;
   detecting, via the primary AI model, a potential use of a player bot when the primary detection results exceed a detection threshold;
   training a secondary AI model to recognize actual players; and
   in response to detecting the potential use of the player bot via the primary AI model:
      processing the actual game data via the secondary AI model to generate secondary detection results; and
      confirming use of the player bot when the secondary detection results indicate the use of the player bot.

2. The method of claim 1, further comprising:
   in response to detecting the potential use of the player bot:
      prompting a user to evaluate the actual game data;
      receiving user input regarding the game play; and
      wherein confirming the use of the player bot is further based on when the user input indicates the use of the player bot.

3. The method of claim 2, further comprising:
   identifying a player associated with the game play for disqualification in response to confirming the use of the player bot.

4. The method of claim 2, wherein the method further comprises:
   updating the training data set when the user input indicates no player bot use.

5. The method of claim 2, wherein prompting the user includes utilizing a graphical user interface.

6. The method of claim 5, wherein the user input is generated via the graphical user interface.

7. The method of claim 1, wherein the method further comprises:
   updating the training data set when the secondary AI model indicates an actual player.

8. The method of claim 1, wherein a probability of error of determining the use of the player bot via the secondary AI model is lower than a probability of error of determining the use of the potential player bot via the primary AI model.

9. The method of claim 1, where processing the actual game data via the primary AI model includes processing the actual game data corresponding to a time window.

10. A method comprising:
    generating, via a game analysis platform that includes at least one processor and at least one memory, a training data set based on game data collected from actual players;
    training, via the game analysis platform, a primary artificial intelligence (AI) model using machine learning based on the training data set to detect cheating software;
    gathering, via the game analysis platform, actual game data from game play;
    processing the actual game data via the primary AI model to generate primary detection results;
    detecting, via the primary AI model, a potential use of cheating software when the primary detection results exceed a detection threshold;
    training a secondary AI model to recognize actual players; and
    in response to detecting the potential use of cheating software via the primary AI model:
       processing the actual game data via the secondary AI model to generate secondary detection results; and
       confirming use of the cheating software when the secondary detection results indicate the use of the cheating software.

11. The method of claim 10, further comprising:
    in response to detecting the potential use of cheating software:
       prompting a user to evaluate the actual game data;
       receiving user input regarding the game play; and
       wherein confirming the use of the cheating software is further based on when the user input indicates the use of the cheating software.

12. The method of claim 11, further comprising:
    identifying a player associated with the game play for disqualification in response to confirming the use of cheating software.

13. The method of claim 11, wherein the method further comprises:
    updating the training data set when the user input indicates no use of cheating software.

14. The method of claim 11, wherein prompting the user includes utilizing a graphical user interface.

15. The method of claim 14, wherein the user input is generated via the graphical user interface.

16. The method of claim 10, wherein the method further comprises:
    updating the training data set when the secondary AI model indicates an actual player.

17. The method of claim 10, wherein a probability of error of determining the use of cheating software via the secondary AI model is lower than a probability of error of determining the use of the potential use of cheating software via the primary AI model.

18. The method of claim 10, where processing the actual game data via the primary AI model includes processing the actual game data corresponding to a time window.

* * * * *